(Model.)

P. E. BIRD.

MACHINE FOR MAKING PITCHFORKS.

No. 262,562. Patented Aug. 15, 1882.

WITNESSES:
S. J. Van Stavoren
A. A. Connolly

INVENTOR,
Peter E. Bird,
By Connolly Bro.,
ATTORNEYS (Model.)
4 Sheets—Sheet 2.
P. E. BIRD.
MACHINE FOR MAKING PITCHFORKS.
No. 262,562. Patented Aug. 15, 1882.
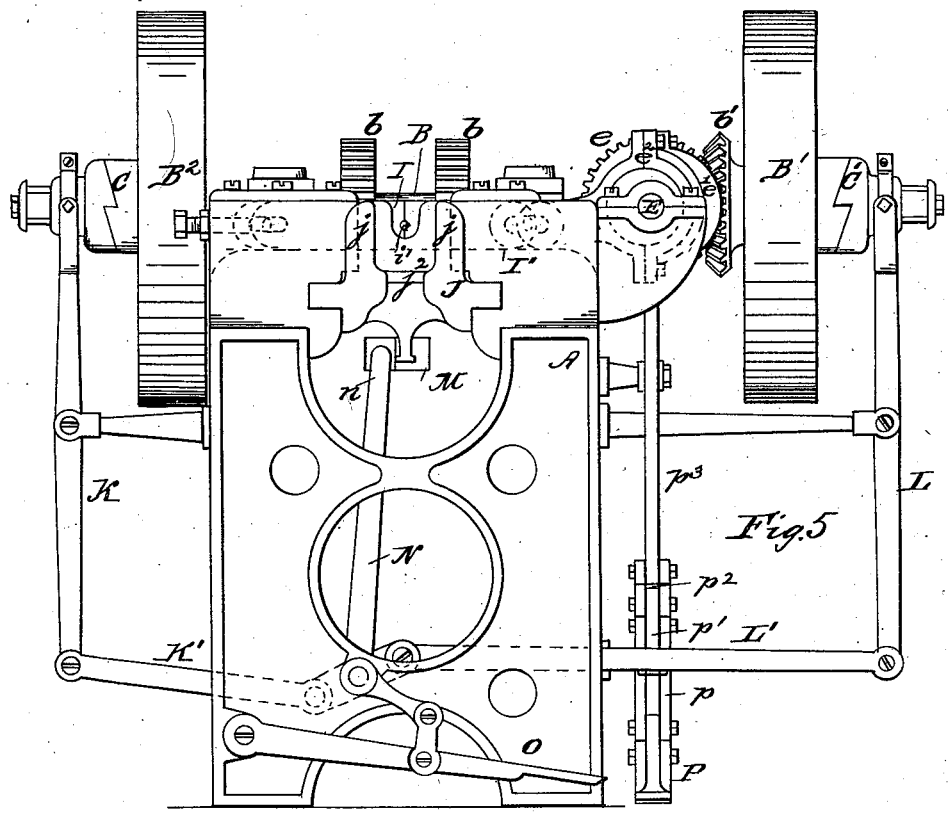
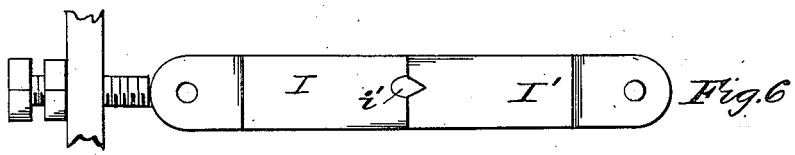
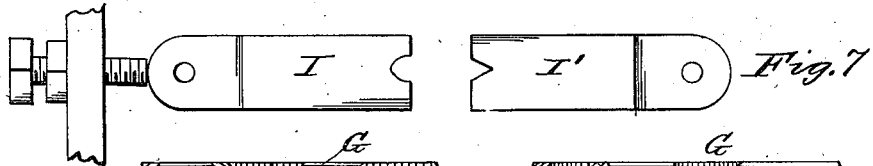
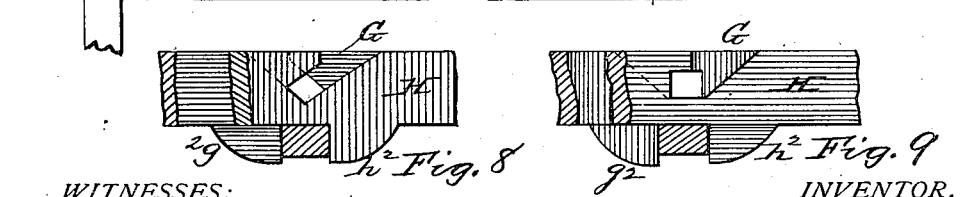
WITNESSES:
INVENTOR,
Peter E. Bird,
By Connolly Bro.,
ATTORNEYS.

(Model.)
4 Sheets—Sheet 3.
P. E. BIRD.
MACHINE FOR MAKING PITCHFORKS.
No. 262,562.
Patented Aug. 15, 1882.
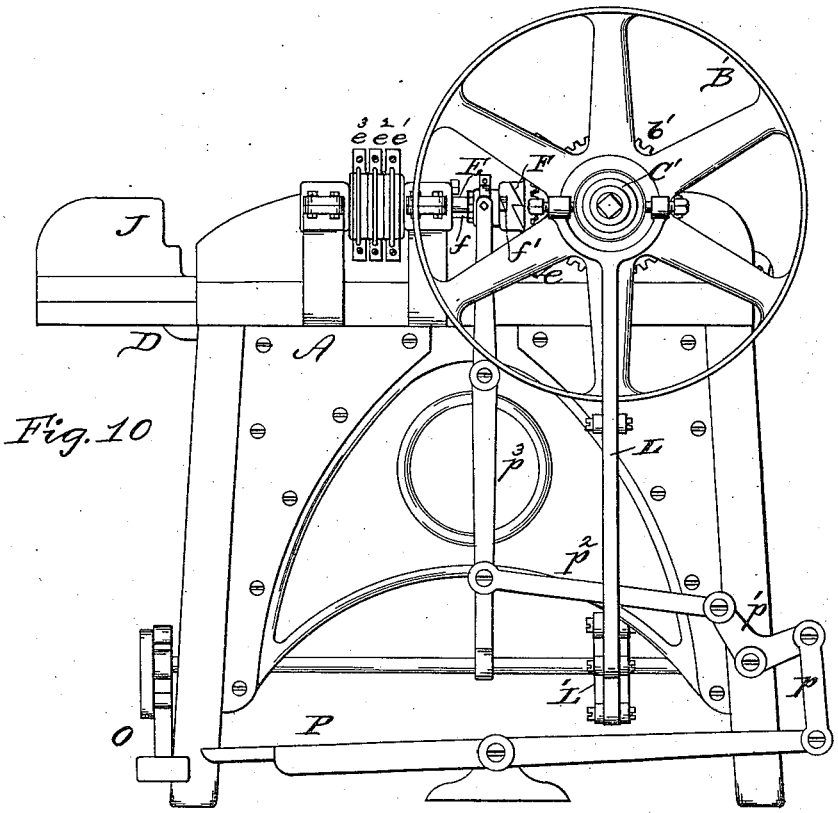
Fig. 10
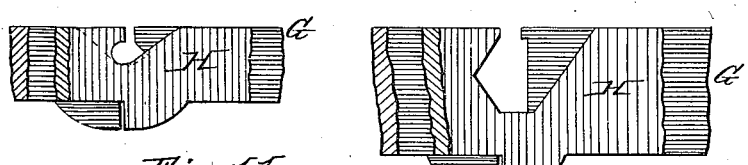
Fig. 11
Fig. 12
WITNESSES:
S. J. Van Stavoren
A. A. Connolly
INVENTOR,
Peter E. Bird,
By Connolly Bros,
ATTORNEYS (Model.)
P. E. BIRD.
MACHINE FOR MAKING PITCHFORKS.
No. 262,562.  Patented Aug. 15, 1882.
4 Sheets—Sheet 4.
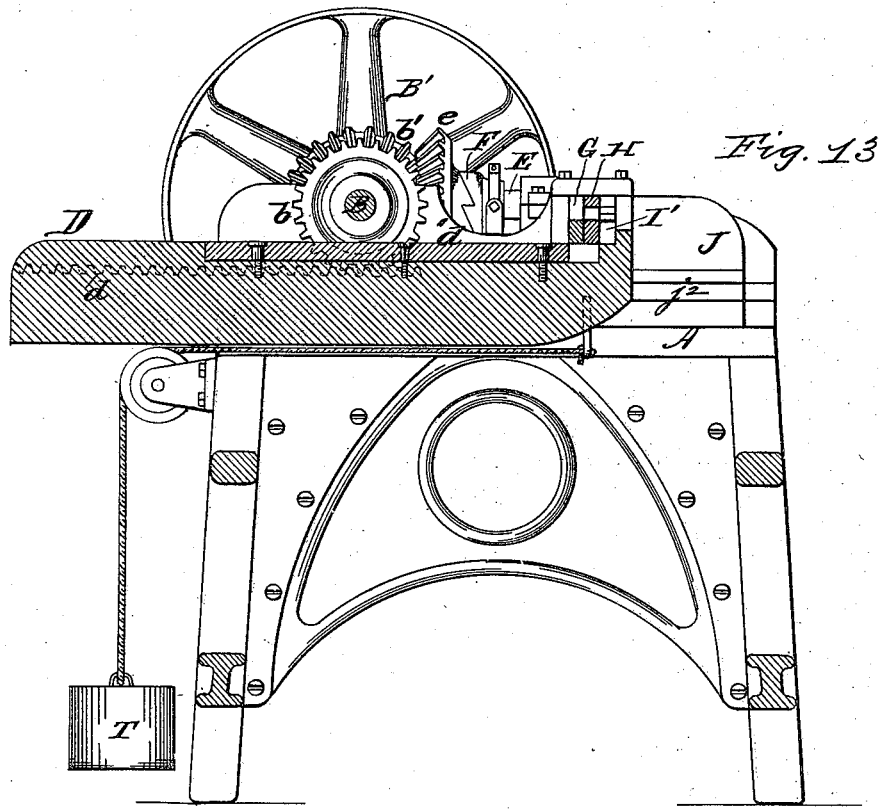
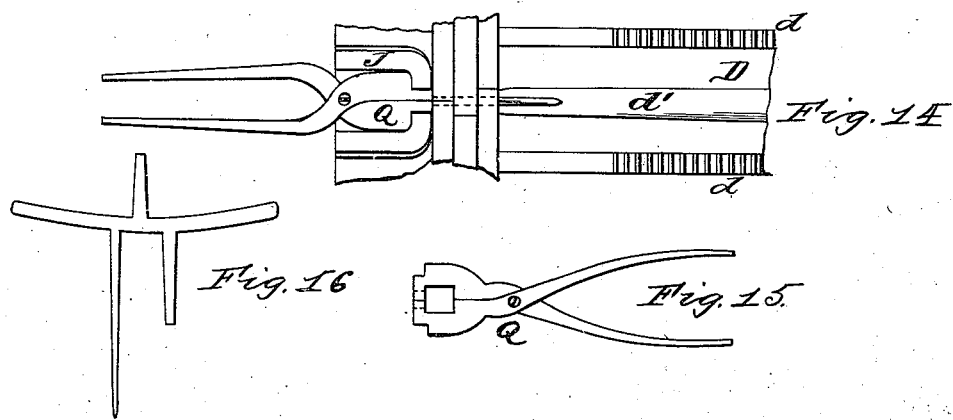
WITNESSES:
S. J. Van Stavoren
A. A. Connolly
INVENTOR,
Peter E. Bird,
By Connolly Bros.,
ATTORNEYS.

UNITED STATES PATENT OFFICE.

PETER E. BIRD, OF JENKINTOWN, PENNSYLVANIA.

MACHINE FOR MAKING PITCHFORKS.

SPECIFICATION forming part of Letters Patent No. 262,562, dated August 15, 1882.

Application filed May 25, 1881. (Model.)

*To all whom it may concern:*

Be it known that I, PETER E. BIRD, a citizen of the United States, residing at Jenkintown, in the county of Montgomery and State of Pennsylvania, have invented certain new and useful Improvements in Machines for Drawing Fork-Tines; and I do hereby declare the following to be a full, clear, and exact description of the invention, reference being had to the accompanying drawings, which form part of this specification, in which—

Figure 1:
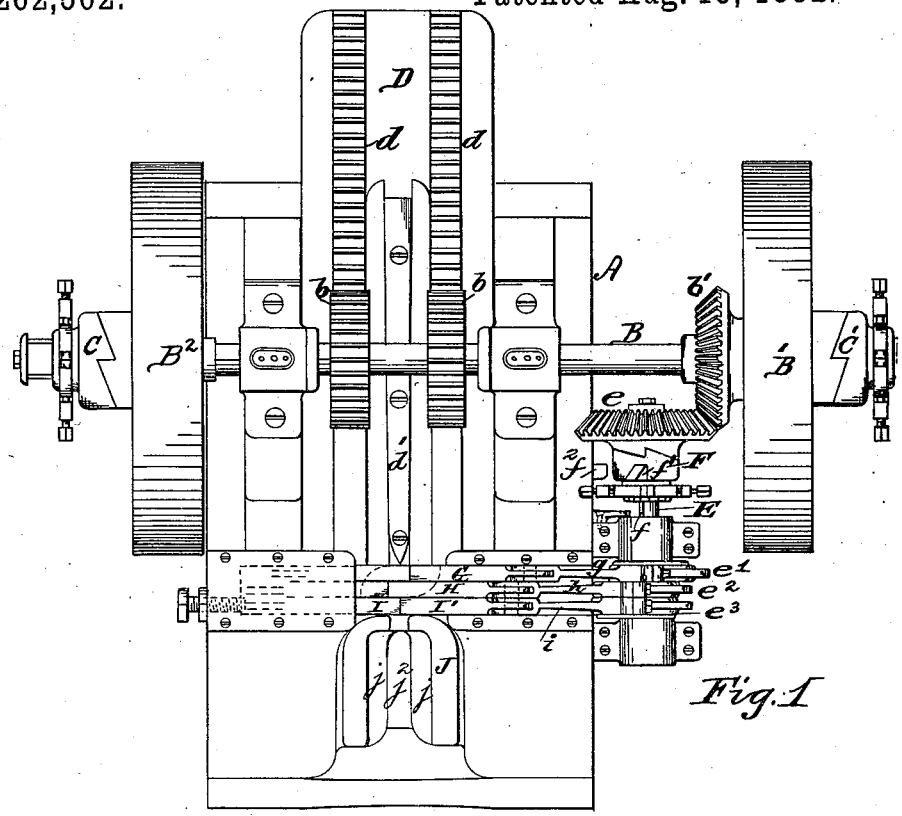

Figure 1 is a plan of a machine embodying my improvements. Fig. 5 is a front elevation, Fig. 10 a side elevation, and Fig. 13 a longitudinal vertical section, of the same. Figs. 2, 3, 4, 6, 7, 8, 9, 11, and 12 are detail views of the various forms of drawing-dies. Fig. 14 is a detail plan, illustrating the manner or mode of drawing a fork-tine. Fig. 15 is a plan of the gripper for holding the tine; and Fig. 16 is a plan of a blank with one of its tines drawn.

My invention has for its object to provide a method of and means for drawing fork-tines by dies so arranged that the matrix or opening betweeen them will be gradually reduced in diameter or area as the tine is drawn between them, so as to diminish the thickness of the latter from head to point.

My invention consists in the method of tapering fork-tines by drawing the same in dies, and in the peculiar construction and combination of parts hereinafter set forth, having reference principally to the following points: first, to the method of tapering fork-tines by means of dies whose matrix or opening is caused to diminish gradually as said tines are drawn in or between them; second, to the combination of two dies having registering openings, which are arranged to overlap one another, and are adapted and designed to be moved longitudinally, so as to gradually diminish the area or diameter of the matrix or opening in them through which a fork-tine is drawn while they are closing; third, to the combination, with overlapping dies having registering openings and arranged and adapted to be slid longitudinally, of a table which moves transversely to the line of movement of said dies and carries a gripping device, which holds the fork-blank and draws the tine through said dies as the latter move upon one another; fourth, to the combination, with said sliding dies and table moving transversely thereto, of a spreader for causing the closing of said dies to be effected simultaneously with the movement of the table; fifth, to the combination, with sliding dies for drawing fork-tines, of cleaning-dies for preventing the formation of lumps about the head of the tines; sixth, to the combination, with sliding dies and a table moving transversely thereto, of an eccentric-shaft for causing said dies to be brought into drawing position before the action of the spreader begins, and for opening said dies subsequently, as hereinafter fully set forth; seventh, to certain details of construction hereinafter more fully described.

Referring to the accompanying drawings, A represents the main frame of the machine, upon which is sustained a transverse shaft, B, having loose pulleys B' B² and clutches C C'. Said shaft also carries pinions $b\ b$, which engage with racks $d\ d$ on a sliding table, D, which is adapted to move longitudinally in guides or ways on the supporting-frame A. Said shaft B also carries a bevel-gear, $b'$, formed on the loose pulley B', and which meshes with another bevel-wheel, $e$, loose on a counter-shaft, E. Said shaft E has a clutch, F, fitted to said shaft by a feather, $f$, and is formed with three eccentrics, $e'\ e^2\ e^3$, the eccentric $e^3$ being reversed radially with reference to the eccentrics $e'\ e^2$.

Figure 2:
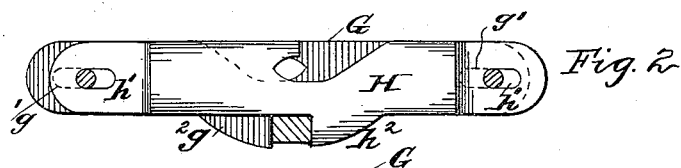
Figure 3:
Figure 4:
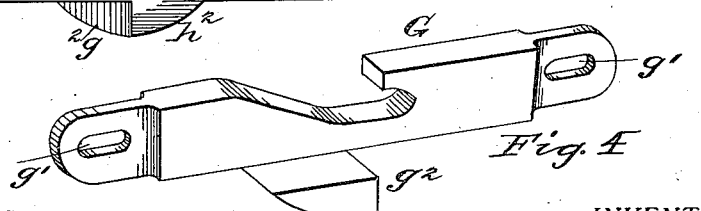

G and H are drawing-dies, connected by loops or connecting-rods $g\ h$ with the eccentrics $e'\ e^2$, so that when the shaft E is revolved said dies will be slid longitudinally in opposite directions—*i. e.*, each in a direction contrary to that of the other. Said dies rest side by side, and are formed with slots or notches $g'\ h'$, which, as the dies are drawn along one another, coincide or register to such extent as to form a matrix or die-opening in these lapping portions for drawing a fork-tine, such matrix being caused to gradually diminish in area or diameter as the dies move toward each other. These openings may be of various forms, according to the shape in cross-section to which it is designed to bring the fork-tine. Figs. 2, 3, and 4 show the required shape for oval tines. Fig. 8 shows shape for drawing diamond-shaped tines; Fig. 9, flat tines; Fig. 11, tines for sluice-forks, and Fig. 12 for spade or angle-back forks. Other shapes may of course be employed, and I do not therefore confine my invention to any particular form of matrix.

I I' are cleaning-dies, or dies the purpose of which is to prevent the formation of a lump about the head of the tine. One of these dies is stationary while the machine is operating. The other is connected by a connecting rod or loop, $i$, with the eccentric $e^3$, so as to be moved toward and from the stationary die when the shaft E is revolved, as hereinafter set forth. These dies I I' do not overlap like the dies G H, but meet end to end, forming a matrix or opening, $i'$. In so meeting they reduce the blank of the tine about the head to the right dimensions, avoiding thus the formation of a lump at this point. Where tines whose opposite sides are alike—such as oval, round, or square tines—are being drawn the die I remains stationary and the die I' moves to and from the same, as hereinafter explained; but where tines whose opposite sides are unlike—such as sluice-fork tines—are being drawn said dies should be interchangeable, so as to be reversed relatively in position when the blank is turned over, such turning over of the blank being necessary in order to bring all of the tines above that being drawn.

The table D carries upon its upper surface a spreader, $d'$, consisting of an elongated wedge which passes, as said table advances, between depending lugs $g^2$ $h^2$ on the dies G H, whereby said dies are moved in opposite directions simultaneously at the same time said table is fed or slid forward.

T represents a weight connected to the table by a cord or chain, the object of said weight being to cause the table to slide backward or make its return-stroke after the spreader has accomplished its full movement. Said table also carries a head, J, consisting of two parallel sides, $jj$, whose ends adjacent to the dies I I' are bent toward or approach each other, leaving a space, $j^2$, for the insertion of the nose of a gripper or tongs. (Shown in Figs. 14 and 15.)

K, K', L, and L' show levers for throwing on the clutches C C'. Said levers are connected, as shown, with a treadle, O, so that when the latter is depressed the clutches C C' will be thrown into engagement and cause shaft B to revolve.

M represents a knocker on the rear end and under side of the table D and in line with the upper end, $n$, of the lever N. The purpose of this knocker is to come in contact with and move over the lever N, so as to throw the clutches C C' out of engagement when the table D has completed its advance movement.

P is another treadle, connected by levers $p$ $p'$ $p^2$ $p^3$ with clutch F, so that the latter will be thrown into engagement when said treadle is depressed. The clutch F has two cam-studs, $f'$ $f'$, diametrically opposite to each other, and in line therewith is a fixed stud, $f^2$, on the frame A, whereby at every half-revolution of the shaft E the clutch F will be thrown out of engagement, so as to stop the revolution of said shaft.

The operation is as follows: The parts being in their normal position, the dies open, as shown in Fig. 3, the pulleys B' B² and gear-wheels $b'$ $e$ being in constant revolution, a blank such as is shown in Fig. 16 is taken hold of by the tongs, shown in Fig. 15, and inserted in the dies, the jaws of said tongs resting in the head J and the tine that is to be drawn resting in the open matrix of the dies. The treadle P is now depressed, causing the clutches F to come into engagement and permit the shaft E to make a half-revolution, when said clutches are thrown out of engagement by the meeting of one of the cam-studs, $f'$, with the projection $f^2$. During this half-revolution the die I' is moved up until its end meets the end of the die I, "cleaning" the head of the tine. At the same time the dies G and H are slid upon one another until the matrix in them is of the same size as the matrix in dies I I', or equal to the maximum thickness of the tine to be drawn. The treadle O now being depressed, the clutches C C' are brought into contact or engagement with their co-operating members, causing the table D to be slid or fed forward, carrying the tongs Q with it. As soon as the table begins to advance the spreader $d'$ passes between the lugs $g^2$ $h^2$ of the dies G H, and as it moves forward causes said dies to be slid in opposite directions, thus gradually diminishing the area of their opening or matrix. The tine which rests in the matrix is thus drawn through said matrix at the same time that the latter is being contracted, so that said tine is thus diminished in thickness or tapered from head to point in the dies. The table having advanced its full movement, (by which time the tine in the dies has been drawn down to a point,) the knocker M meets the lever N, and, moving the same, causes the clutches C C' to be thrown out of engagement. The weight T, being free to act, now draws back the table to its normal position. The treadle P is again depressed, producing another half-revolution of the shaft E and restoring the dies G, H, and I to their open position, ready for the insertion of another tine.

By forming fork-tines by the method and means herein described the same are produced clean and smooth, without fins or lumps, and with a uniform taper, size, and shape. By these means, too, the work may be done rapidly by unskilled labor, reducing the expense materially over methods of tapering the tines by hammering or in rolls, where skilled labor is required. Furthermore, no matter how many tines are on a head, they can all be tapered readily or manipulated by the means herein described, while with rolls not more than three tines on a fork can be drawn.

What I claim as my invention is as follows:

1. The method or process of tapering fork-tines by drawing or moving the same lengthwise through dies simultaneously with moving said dies toward each other transversely of the tine, substantially as set forth.

2. A machine for drawing fork-tines, provided with overlapping dies with registering openings, forming a matrix, said dies being constructed and adapted to slide in opposite directions simultaneously, whereby their matrix is gradually diminished in diameter or area, substantially as set forth.

3. In combination with overlapping dies G H, designed and adapted to slide upon one another, a table, D, designed and adapted to move transversely thereto, so as to draw tines through said dies while their matrix is being diminished in area or diameter, substantially as set forth.

4. The combination, with overlapping dies G H, having lugs $g^2$ $h^2$, of table D, having spreader $d'$ for causing said dies to slide upon one another as the table advances, substantially as shown and set forth.

5. The table D, having head J, with opening $j^2$, designed for the reception of a fork-blank, and the tongs for holding the same, substantially as shown and set forth.

6. In combination with table D, having racks $d$ and knocker M, the shaft B, with pinions $b$ $b$ and clutches C C', weight T, and levers K K' L L' N, whereby the forward and backward movement of said table is effected, substantially as shown and described.

7. In combination with the drawing-dies G H, the dies I I' for cleaning the tine about the head, substantially as shown and described.

8. In combination with sliding dies G, H, and I, the shaft E, having eccentrics or cranks $e'$ $e^2$ $e^3$, and clutch F, with cams $f'$ $f''$, whereby one half-revolution of said shaft brings said dies into position for drawing and the other half-revolution opens said dies, substantially as shown and described.

In testimony that I claim the foregoing I have hereunto set my hand this 14th day of May, 1881.

PETER E. BIRD.

Witnesses:
 E. D. McLOUGHLIN,
 S. J. VAN STAVOREN.